(12) United States Patent
Morgan et al.

(10) Patent No.: US 11,948,184 B2
(45) Date of Patent: Apr. 2, 2024

(54) SYSTEMS AND METHODS FOR FLOORSPACE MEASUREMENT

(71) Applicant: NCR Voyix Corporation, Atlanta, GA (US)

(72) Inventors: Kip Oliver Morgan, Atlanta, GA (US); James Emery Fugedy, II, Marietta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 750 days.

(21) Appl. No.: 16/697,643

(22) Filed: Nov. 27, 2019

(65) Prior Publication Data

US 2021/0158429 A1 May 27, 2021

(51) Int. Cl.
  *G06Q 30/00* (2023.01)
  *G06F 16/23* (2019.01)
  *G06Q 30/0283* (2023.01)
  *G06Q 30/0601* (2023.01)

(52) U.S. Cl.
  CPC ..... *G06Q 30/0639* (2013.01); *G06F 16/2379* (2019.01); *G06Q 30/0283* (2013.01)

(58) Field of Classification Search
  CPC .......... G06Q 30/0639; G06Q 30/0283; G06Q 30/06; G06Q 30/02; G06F 16/2379; G06F 16/23
  USPC ...................................................... 705/26, 27
  See application file for complete search history.

(56) References Cited

U.S. PATENT DOCUMENTS

| | | | |
|---|---|---|---|
| 8,374,906 B1 * | 2/2013 | Williams | G06Q 30/02 705/400 |
| 10,733,661 B1 * | 8/2020 | Bergstrom | G06Q 30/0643 |
| 11,126,961 B2 * | 9/2021 | Kulkarni Wadhonkar | G06Q 10/087 |
| 2011/0261049 A1 * | 10/2011 | Cardno | G06Q 40/04 345/419 |
| 2013/0103608 A1 * | 4/2013 | Scipioni | G06Q 30/0282 705/346 |
| 2013/0173435 A1 * | 7/2013 | Cozad, Jr. | G06Q 10/087 705/28 |
| 2014/0253383 A1 * | 9/2014 | Rowitch | G01S 5/0236 342/386 |
| 2014/0365334 A1 * | 12/2014 | Hurewitz | G06Q 30/0613 705/26.41 |

(Continued)

OTHER PUBLICATIONS

More garden centres 'sweating the space', Appleby, Matthew, Horticulture Week: 7. Haymarket Business Publications Ltd. (Mar. 3, 2017); Dialog #1875650457, 2pgs. (Year: 2017).*

(Continued)

*Primary Examiner* — Robert M Pond
(74) *Attorney, Agent, or Firm* — Schwegman Lundberg & Woessner, P.A.

(57) ABSTRACT

Various embodiments herein each include at least one of systems, methods, software, apps, and visualizations for floorspace management. In particular, some embodiments leverage mobile shopping and other technologies to identify when and where a customer selects items within a retail space and completes the purchase. This data is then stored and visualizations are generated from this data for areas and periods. Such embodiments enable identification of well-performing and under-performing areas of retail space based on criteria pertinent to the particular user.

15 Claims, 6 Drawing Sheets

(56) References Cited

U.S. PATENT DOCUMENTS

| | | | | |
|---|---|---|---|---|
| 2015/0269549 A1* | 9/2015 | Herring | ............... | G06Q 20/203 |
| | | | | 705/18 |
| 2016/0253707 A1* | 9/2016 | Momin | ............. | G01C 21/3461 |
| | | | | 705/14.54 |
| 2017/0138736 A1* | 5/2017 | Simon | ................... | G06T 11/206 |
| 2017/0272155 A1* | 9/2017 | Olsen | .................. | H04B 10/116 |
| 2018/0025412 A1* | 1/2018 | Chaubard | .............. | G06V 20/52 |
| | | | | 705/26.9 |
| 2019/0213616 A1* | 7/2019 | Eppley | ................. | H04W 4/029 |
| 2019/0392220 A1* | 12/2019 | Maan | ..................... | G06Q 20/20 |

OTHER PUBLICATIONS

Acuity Brands, Inc. Demonstrates Retail Indoor Positioning System Solution with New Asset Tracking Technology at Shoptalk 2017 ICT Monitor Worldwide [Amman] Mar. 21, 2017; Dialog #1879090588, 2pgs. (Year: 2017).*

* cited by examiner

SYSTEMS AND METHODS FOR FLOORSPACE MEASUREMENT

BACKGROUND INFORMATION

Measuring space and the utility thereof is important in retail. While measuring area, such as square feet, may be straight forward, determining the sales or profit per square unity of measure can be quite difficult. Even if product locations are known, a single product may be present in multiple locations throughout a retail space. Thus, at checkout, it is challenging, if not impossible, to determine where the product was picked up by a shopper. Absent such information, retailers lack an ability to accurately identify areas that generate the "best" sales, whether that is measured in revenue, profit, volume, or otherwise.

SUMMARY

Various embodiments herein each include at least one of systems, methods, software, apps, and visualizations for floorspace management. In particular, some embodiments leverage mobile shopping and other technologies to identify when and where a customer selects items within a retail space and completes the purchase. This data is then stored and visualizations are generated from this data for areas and periods. Such embodiments enable identification of well-performing and under-performing areas of retail space based on criteria pertinent to the particular user.

One such embodiment is a method that may be performed in whole or part by an app that executes on a mobile device of a shopper. For example, the method includes receiving an image of an item and reading an item identifier included in the image. The method further includes recording data from which a location of where the image was captured is determinable and transmitting data over a network to a database of a store management system including the item identifier, location data, time of day, and price data.

Another method embodiment, as may be performed on a server, such as part of a store management system, includes receiving, via a network, sale data including an item identifier and data identifying a location of where the item identifier was captured. The method may then store the item identifier, data identifying the location, time of day, and pricing data to a database. Subsequently the method includes generating a visualization from the stored data for a period including a representation of at least a factor of the pricing data for each of a plurality of areas associated with location identifiers including one of which the data identifying the location is associated. The visualization may then be output.

DETAILED DESCRIPTION

Various embodiments herein each include at least one of systems, methods, software, apps, and visualizations for floorspace management. In particular, some embodiments leverage mobile shopping and other technologies to identify when and where a customer selects items within a retail space and completes the purchase. This data is then stored and visualizations are generated from this data for areas and periods. Such embodiments enable identification of well-performing and under-performing areas of retail space based on criteria pertinent to the particular user. For example, a heat chart visualization may be generated in some embodiments for a period with a coloring or shading in each defined area of a store map. The coloring or shading is defined to represent a particular parameter, such as sales revenue, profit, sales volume by unit, sales per hour, and the like. Each visualization is generated for a period of interest, such as an hour, 9:00 AM-12:00 PM, a whole day, a week, or other period. The particular coloring or shading may be defined to certain values, as relative values (e.g., in quarters from lowest to highest represented as dark blue, light blue, pink, and red respectively), and the like. Some embodiments may include generation of animations that show heat charts as they change over time from hour to hour, period to period, day to day, week to week, and the like.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
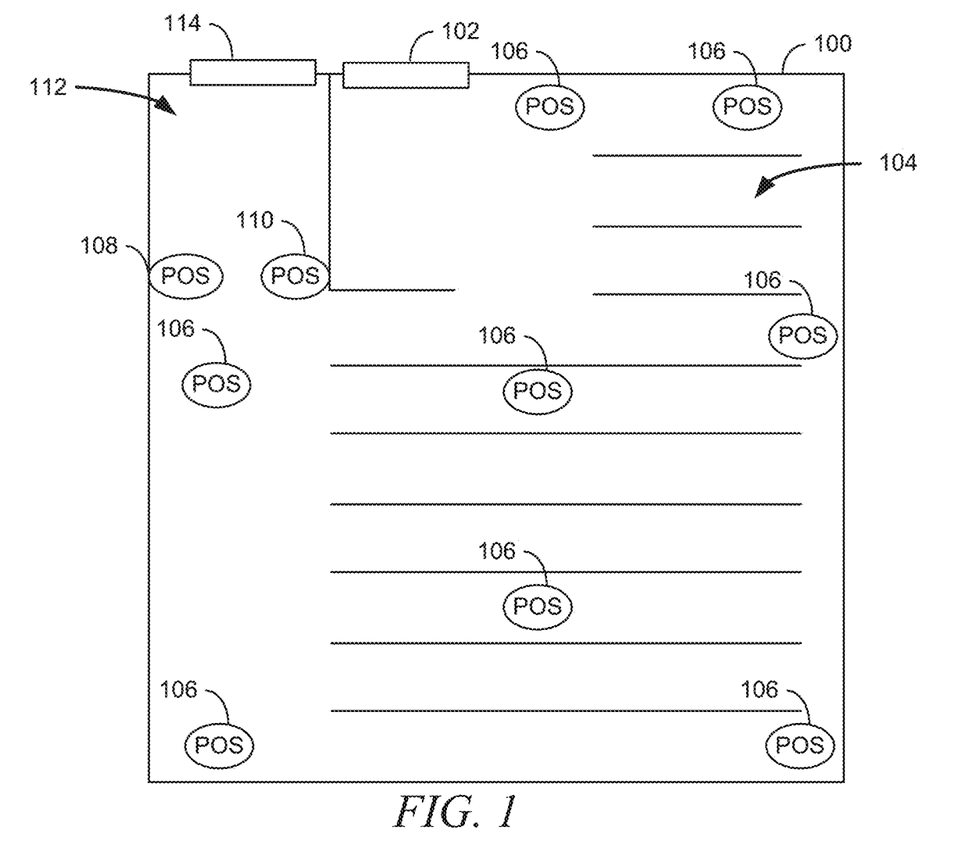
FIG. 1 is an illustration of a retail space with a system deployed therein, according to an example embodiment.

FIG. 1 is an illustration of a retail space 100 with a system deployed therein, according to an example embodiment. The retail space 100 includes an entrance 102 to a shopping area 104. The shopping area 104 includes a plurality of positioning devices 106 of an indoor positioning system. The retail space 100 also includes point of sale (POS) terminals 108, 110 which may be one or both of teller assisted and self-service. However, in some embodiments, the POS terminals 108, 110 may include one or more pay stations that operate along with a shopping app that executes on mobile devices of shoppers. The pay station of such embodiment includes radio functionality or works in partnership with data form the positioning system and the positioning devices 106 to locate a shopper within a pay area 112. The pay area in such embodiments is an area within the retail space 100 where mobile shoppers are required to pay rather than simply anywhere within the retail space. The pay station confirms when a shopper has paid and provides an output to the shopper and store personnel for purposes of reassuring shoppers that they have in fact paid and the store that the shopper is not stealing. Once the pay station provides the payment confirmation, the shopper departs from the exit 114.

The indoor positioning system and the positioning devices 106 may be one of several competing technologies, such as radio beacon devices (e.g., BLUETOOTH®, BLUETOOTH® Low Energy (BLE), WI-FI®), sonic devices, light devices such as Visible Light Communication devices (VLC), and the like. Some embodiments may also or alternatively include image and video capture devices deployed as the positioning devices 106 that assist tracking algorithms that track shoppers as they move throughout the retail space 100.

Figure 2:
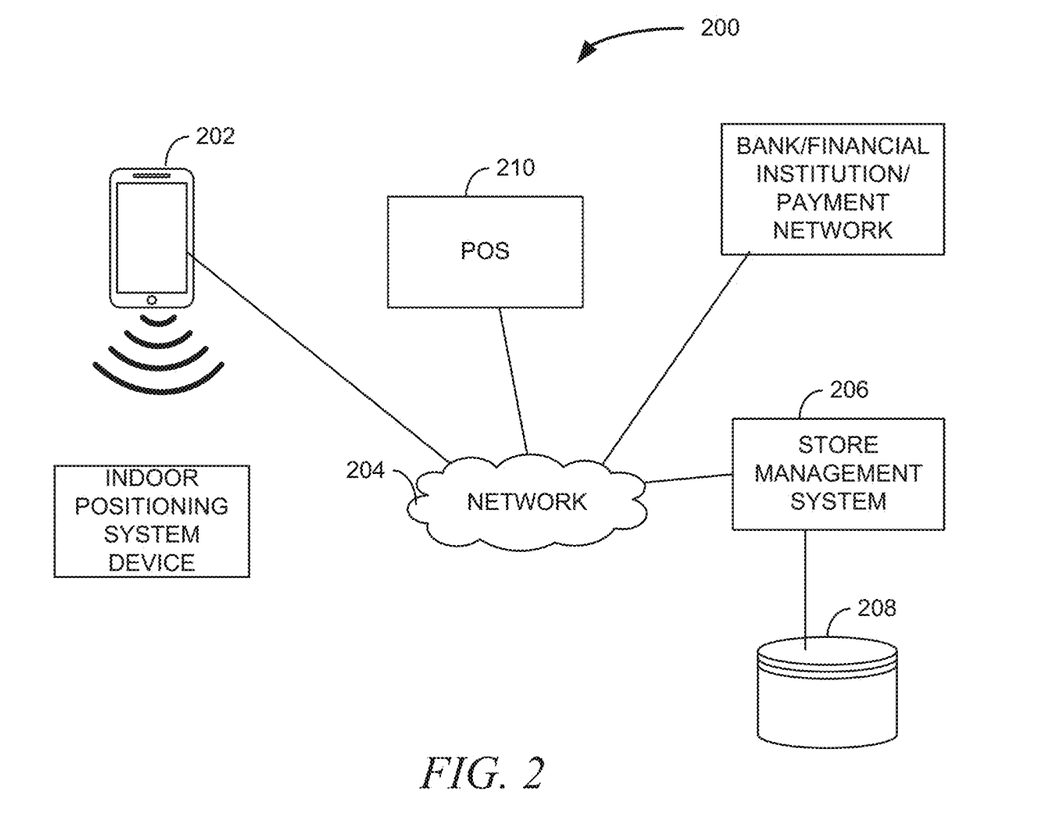
FIG. 2 is a logical block diagram of a system, according to an example embodiment.

FIG. 2 is a logical block diagram of a system 200, according to an example embodiment. The system 200 is a system that may be deployed with regard to the retail space 100 of FIG. 1. The system includes a shopper mobile device 202. The shopper mobile device 202, although illustrated as a single mobile device 202, is typically a plurality of mobile devices 202 with each of many shoppers having their own mobile device 202. with a shopping app installed and executing thereon.

The app that executes on the mobile device 202 typically includes a product scanning function that utilizes a camera of the mobile device 202. The camera captures an image of an item identifier such as barcode or Quick Response (QR) code of an item, decodes the item identifier from the image, and outputs the item identifier to a purchase function. The item identifier may be a Universal Product Code (UPC) in some embodiments. In other embodiments, the item identifier may be a shop keeper unit (SKU) used to track inventory in a store. The purchase function adds the item to a virtual shopping cart and may calculate a running total. When adding the item to the virtual shopping cart, the mobile device app may record a time of day and location within the retail space 100 where the item was scanned. The location may be determined by one or both of the app or mobile device 202 through utilization of the indoor positioning system and devices 106 thereof. The time of day and location data may then be uploaded via a network 204 to a store management system 206 and stored in a database 208 thereof. Price data may also be stored to the database 208, such as one or more of sale price, item cost, item profit, and the like. Eventually the shopper will checkout either at a POS station 210 or within the app of the mobile device 210. Should items added to the cart not be purchased, the items may be removed from the virtual cart. Also, if the shopping session is not closed by sale or return of items to the shelves or otherwise, data of shopping session may be rolled back from the database or moved to a queue for investigation by store personnel to determine whether the shopping session was the subject of theft, other fraud, or simply return or abandonment of the items.

Figure 3:
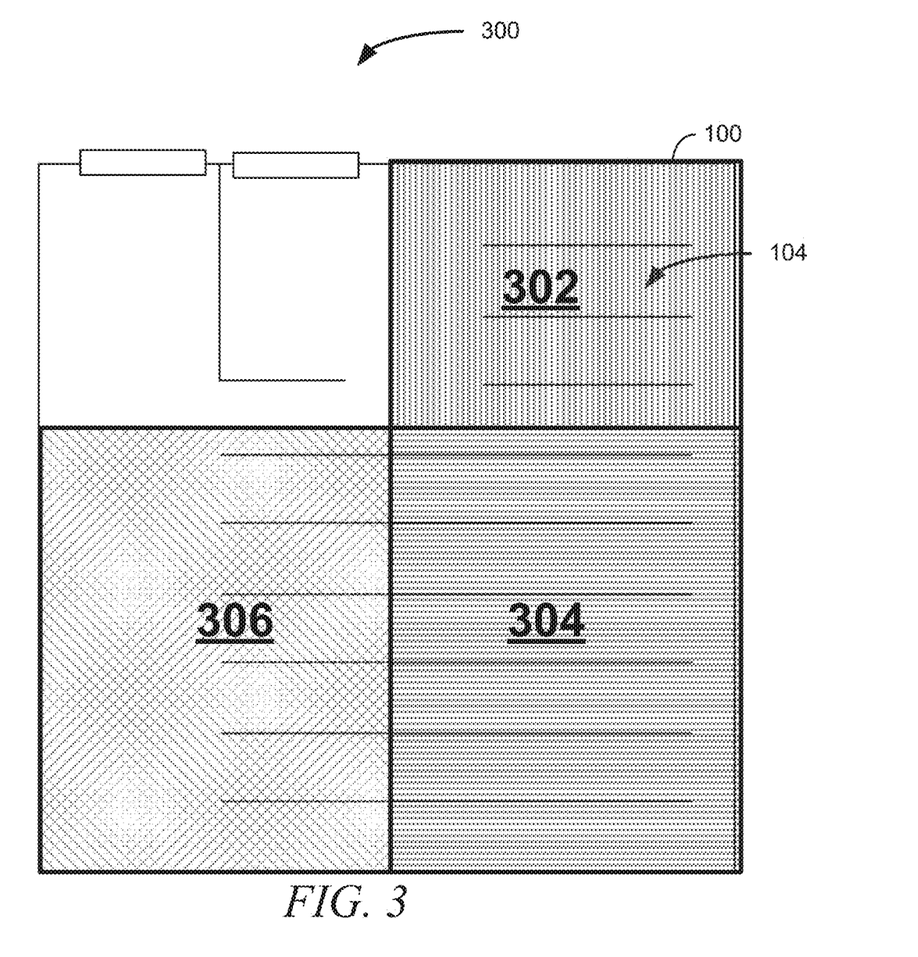
FIG. 3 is an illustration of a visualization, according to an example embodiment

FIG. 3 is an illustration of a visualization 300, according to an example embodiment. The visualization 300 includes a heat map of the shopping area 104 within the retail space 102. The shopping area 104 is broken down into three areas 302, 304, 306. The visualization 300 is generated to illustrate shopping activity in these three areas 302, 304, 306 from data stored in a database, such as the store management system 206 database 208 of FIG. 2. The shopping activity includes item sales that occurred by shoppers scanning or otherwise selecting items with their mobile device 202. apps in the various areas 302, 304, 306 during a relevant period of the visualization 300. Each of the areas 302, 304, 306 is shaded to represent the sales activity in the respective areas 302, 304, 306. The visualization 300 utilizes shading, but others may use various colors, shading, textures, and other indicators to represent the data. Such a visualization 300 assists store personnel in identifying underperforming areas of the shopping area 104 for purpose of deciding how to reorganize items to maximize or balance shopping activity and shopping traffic within the retail space 102.

Figure 4:
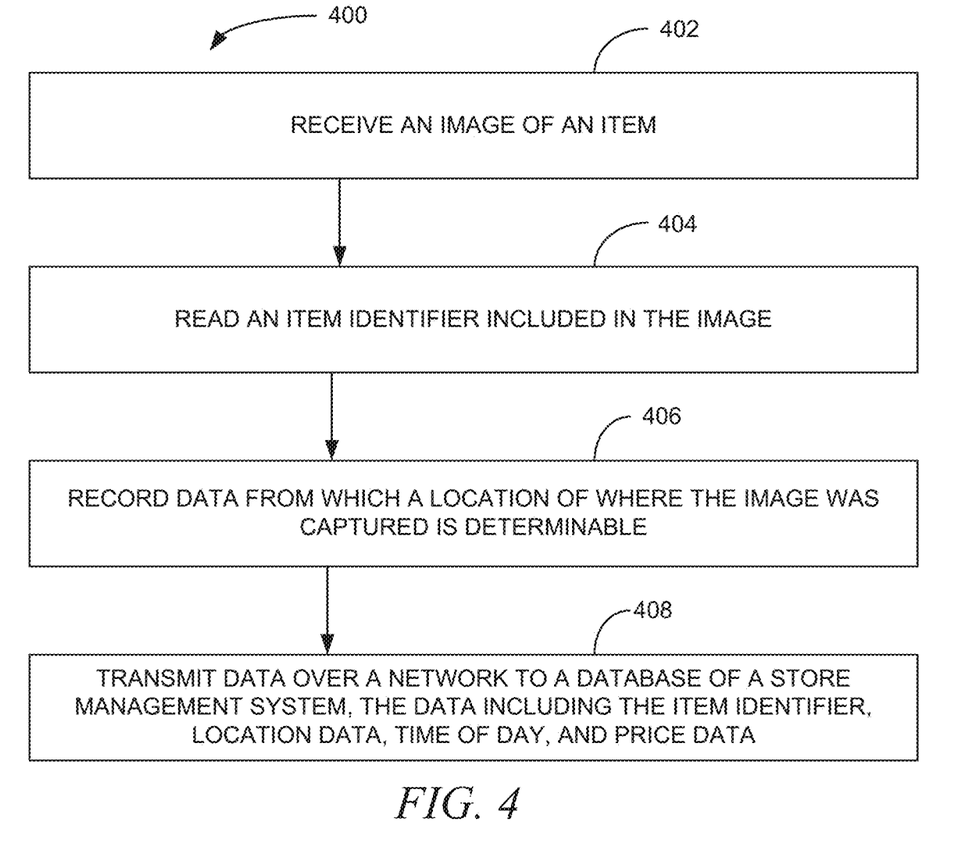
FIG. 4 is a block flow diagram of a method, according to an example embodiment.

FIG. 4 is a block flow diagram of a method 400, according to an example embodiment. The method 400 is an example of a method that may be performed in whole or in part by an app deployed to a mobile device.

The method 400 includes receiving 402 an image of an item, reading 404 an item identifier included in the image, and recording 406 data from which a location of where the image was captured is determinable. The method 400 further includes transmitting 408 data over a network to a database of a store management system. The data transmitted 408 in some such embodiments includes one or more of the item identifier, location data, time of day, and price data.

In some embodiments, the data from which the location is determinable in the method 400 is at least in part data received in a radio signal from at least one beacon device that has a location represented in data stored by the store management system. The beacon device in some of these embodiments is a device of an indoor positioning system. The indoor positioning system may be radio signal-based, visual light communication-based, audio signal-based, other similar technologies, and combinations thereof.

Figure 5:
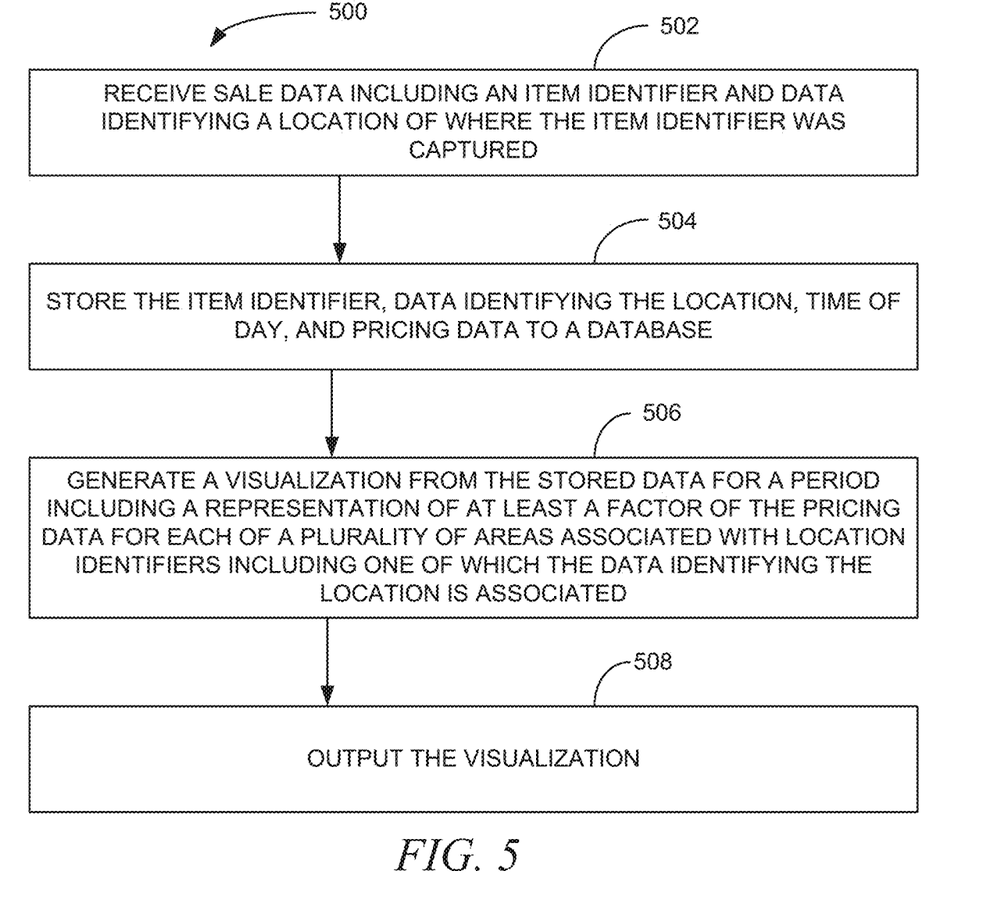
FIG. 5 is a block flow diagram of a method, according to an example embodiment.

FIG. 5 is a block flow diagram of a method 500, according to an example embodiment. The method 500 is an example of a method that may be performed in whole or in part by a store management system 206 of FIG. 2

The method 500 includes receiving 502, via a network, sale data including an item identifier and data identifying a location of where the item identifier was captured and storing 504 the item identifier, data identifying the location, time of day, and pricing data to a database, such as database 208 of FIG. 2. The method 500 further includes generating 506 a visualization from the stored data for a period. The generated 506 visualization of some embodiments includes a representation of at least a factor of the pricing data for each of a plurality of areas associated with location identifiers including one of which the data identifying the location is associated. Such factors may include sales unit volume, revenue, profit, and the like. The method 500 then outputs 508 the visualization, which may include outputting a digital dataset renderable on a display device, as a printed document, as an image that can be stored and shared, and the like.

In some embodiments, prior to generating 506 the visualization, the data identifying the location is further processed to obtain a location identifier. For example, beacon data may be processed to triangulate a position within a store that is associated with an area that will be included in the generated 506 visualization.

In some embodiments of the method 500, the data identifying the location is an area identifier, or data from which an area identifier is determinable, of a plurality of area identifiers of a store. For example, one or more beacon identifiers. In some such embodiments, the pricing data includes at least two of an item price, an item cost, and an item profit/loss amount. Further in some such embodiments, each area has a known area size and the generated visualization includes a representation of at least a portion of the pricing data of an area in view of the size of the respective area. This may include a representation of sale volume, revenue, or profit per square foot or square meter.

Figure 6:
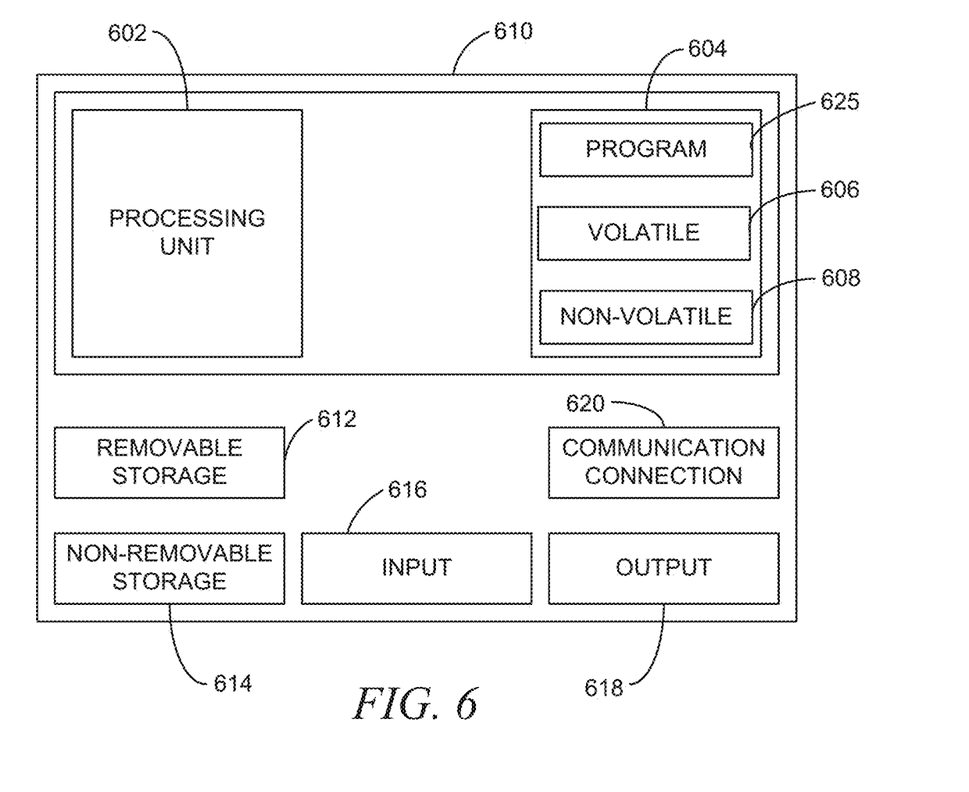
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices. For example, the communication connection 620 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 602 of the computer 610. A hard drive(magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving, by a processor, an image of an item;
    reading, by the processor, an item identifier included in the image;
    recording, by the processor, data from which a location of where the image was scanned is determinable, wherein the data is recorded when the reading of the item identifier is processed at and within a defined retail space of a store and the data is recorded with a time of day and calendar date associated with the reading, wherein the data from which the location is determinable is at least in part data received in a radio signal from at least one beacon device that has a location represented in data stored by the store management system, wherein the data from which the location is determinable is at least in part data received from an indoor positioning system, wherein the position system includes a plurality of radio devices and visible light communication devices;
    transmitting, by the processor, data over a network to a database of a store management system, the data including the item identifier, location data, the time of day, the calendar date, and price data;
    iterating, by the processor, back to the receiving for a plurality of checkouts and a plurality of purchased items by customers of the store;
    providing a visualization from the database as a heat map of a shopping area within the store depicting when and where item sales occurred within the shopping area and changes to the heat map over time, wherein the visualization includes predefined colors or shadings for sales revenue, profit, sales volume by unit, and sales per hour; and providing animations for the heat map within the visualization that show the heat map changing over time from period to period.

2. The method of claim 1, wherein the store locating system includes a visible light communication-based function.

3. The method of claim 1, wherein the method is performed at least in part by an app that executes on a mobile device of a shopper.

4. The method of claim 1, wherein the item identifier included in the image is a barcode representation of a universal product code (UPC).

5. The method of claim 1, wherein the determinable location of where the image was scanned is a defined area within the store.

6. A method comprising:
 receiving, via a network by a processor, sale data including an item identifier and data identifying a location of where the item identifier was scanned at or within a retail space of a store and a time of day and calendar date that the item identifier was scanned, wherein the data from which the location is determinable is at least in part data received in a radio signal from at least one beacon device that has a location represented in data stored by the store management system, wherein the data from which the location is determinable is at least in part data received from an indoor positioning system, wherein the position system includes a plurality of radio devices and visible light communication devices;
 storing, by the processor, the item identifier, data identifying the location, the time of day, the calendar date, and pricing data to a database;
 iterating, by the processor to the receiving for a plurality of sale data of a store and a plurality of purchased items associated with the store;
 generating, by the processor, a visualization from the stored data for a period including a representation of at least a factor of the pricing data for each of a plurality of areas associated with location identifiers including one of which the data identifying the location is associated;
 outputting, by the processor, the visualization as a heat map of a shopping area within the store depicting when and where item sales occurred within the shopping area and changes to the heat map over time, wherein the visualization includes predefined colors or shadings for sales revenue, profit, sales volume by unit, and sales per hour; and
 providing, by the processor, animations for the heat map within the visualization that show the heat map changing over time from period to period.

7. The method of claim 6, wherein the visualization is output from as a digital dataset renderable on a display device.

8. The method of claim 6, wherein the data identifying the location is an area identifier, or data from which an area identifier is determinable, of a plurality of area identifiers of the store.

9. The method of claim 8, wherein the pricing data includes at least two of an item price, an item cost, and an item profit/loss amount.

10. The method of claim 9, wherein each area has a known area size and the visualization includes a representation of at least a portion of the pricing data of an area in view of the size of the respective area.

11. The method of claim 10, wherein the pricing data of an area in view of the size of the respective area of a visualization is a value of sales per square foot of the respective area.

12. A system comprising:
 a network interface device;
 a computer processor; and
 a memory storing instructions executable by the computer processor to perform data processing activities comprising:
  receiving, via the network interface device, sale data including an item identifier and data identifying a location of where the item identifier was scanned at or within a retail space of a store and a time of day and calendar date that the item identifier was scanned, wherein the data from which the location is determinable is at least in part data received in a radio signal from at least one beacon device that has a location represented in data stored by the store management system, wherein the data from which the location is determinable is at least in part data received from an indoor positioning system wherein the position system includes a plurality of radio devices and visible light communication devices;
  storing the item identifier, data identifying the location, the time of day, the calendar date, and pricing data to a database;
  iterating to the receiving for a plurality of sale data of a store and a plurality of purchased items associated with the store;
  generating a visualization from the stored data for a period including a representation of at least a factor of the pricing data for each of a plurality of areas associated with location identifiers including one of which the data identifying the location is associated;
  outputting the visualization as a heat map of a shopping area within the store depicting when and where item sales occurred within the shopping area and changes to the heat map over time, wherein the visualization includes predefined colors or shadings for sales revenue, profit, sales volume by unit, and sales per hour; and
  providing animations for the heat map within the visualization that show the heat map changing over time from period to period.

13. The system of claim 12, wherein the data identifying the location is an area identifier, or data from which an area identifier is determinable, of a plurality of area identifiers of the store.

14. The system of claim 13, wherein the pricing data includes at least two of an item price, an item cost, and an item profit/loss amount.

15. The system of claim 14, wherein:
 each area has a known area size and the visualization includes a representation of at least a portion of the pricing data of an area in view of the size of the respective area; and
 the pricing data of an area in view of the size of the respective area of a visualization is a value of sales per square foot of the respective area.

* * * * *